Figure 1:
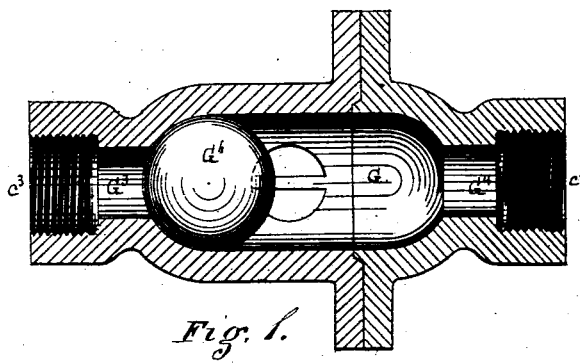

(No Model.)     8 Sheets—Sheet 1.

H. TILDEN.
Interlocking Fluid Pressure Switch and Signal Apparatus.

No. 237,786.    Patented Feb. 15, 1881.

Witnesses:
R. H. Whittlesey
O. L. Parker

Inventor Harvey Tilden,
By Attorney George H. Christy

N. PETERS, PHOTO-LITHOGRAPHER, WASHINGTON, D. C.

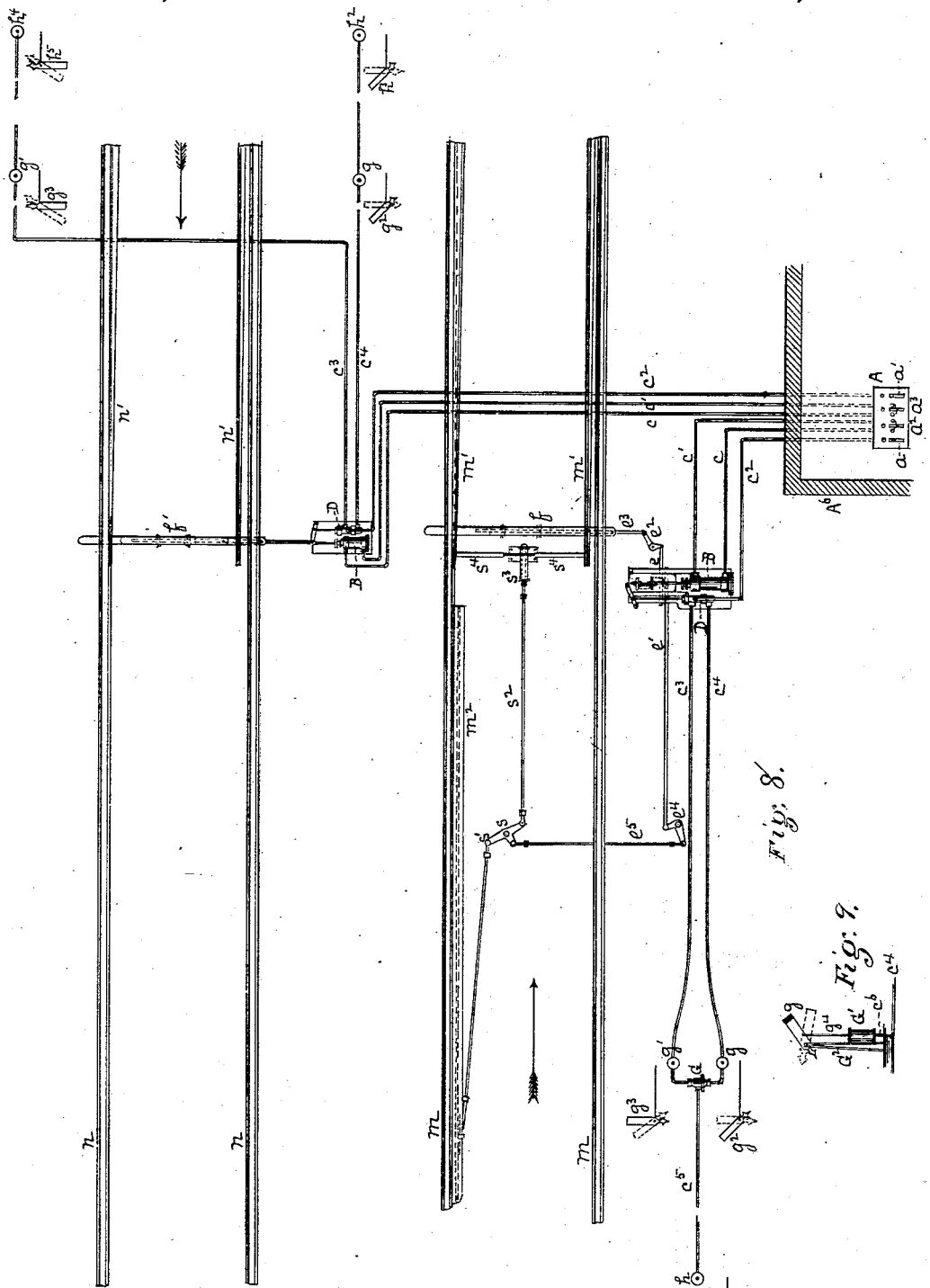

(No Model.) 8 Sheets—Sheet 4.
H. TILDEN.
Interlocking Fluid Pressure Switch and Signal Apparatus.
No. 237,786. Patented Feb. 15, 1881.
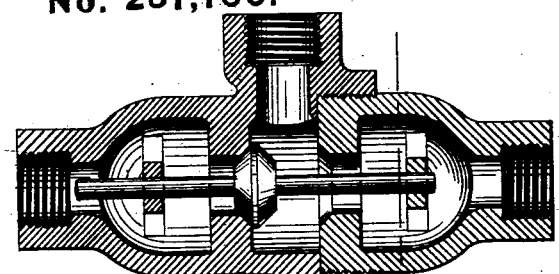
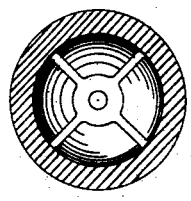
Fig. 10. Fig. 11.
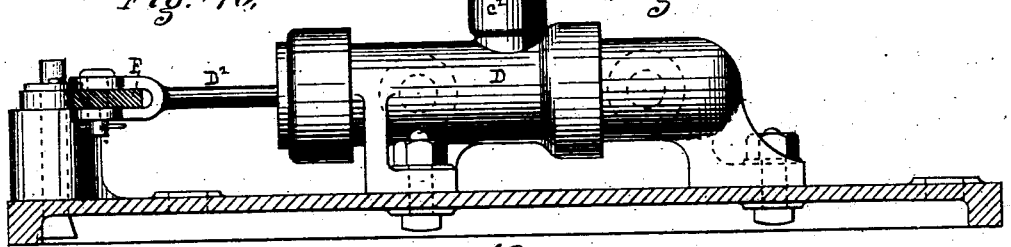
Fig. 12.
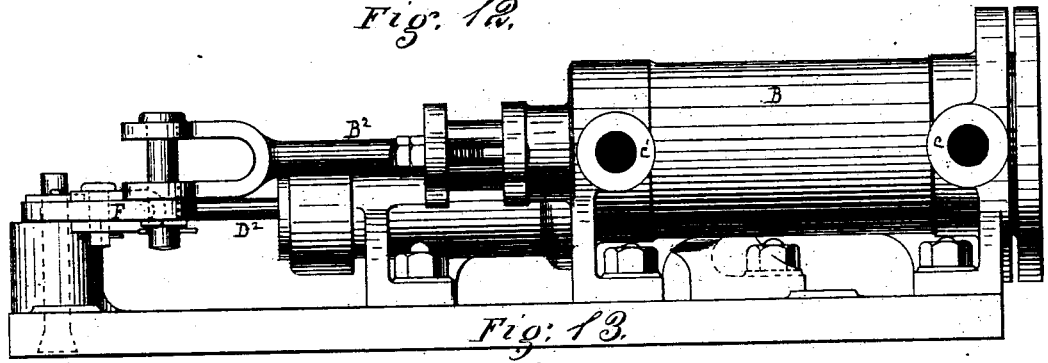
Fig. 13.
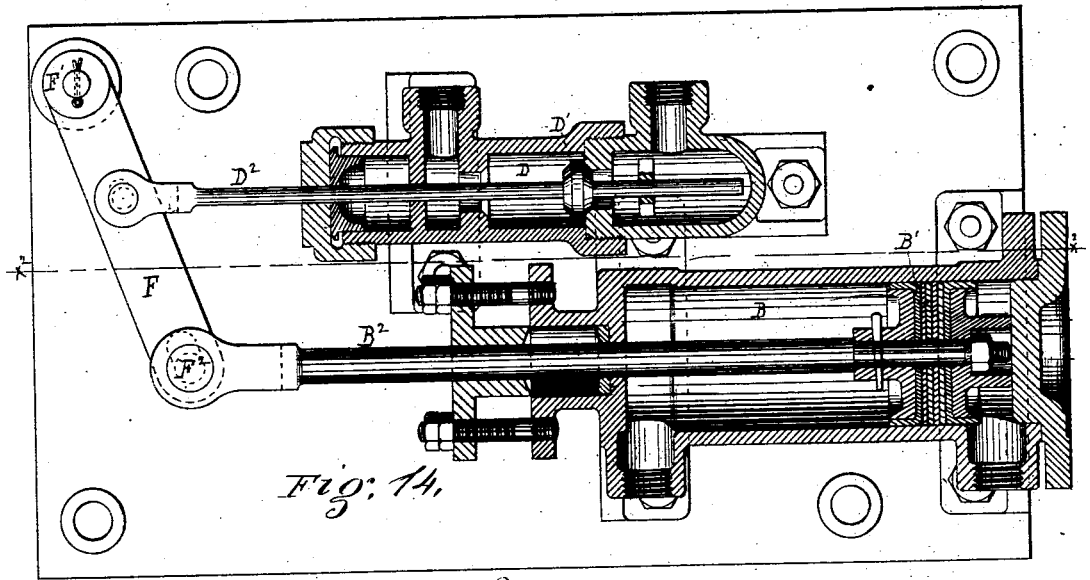
Fig. 14.
Witnesses Inventor Harry Tilden
By Attorney George H. Christy (No Model.) 8 Sheets—Sheet 6.
H. TILDEN.
Interlocking Fluid Pressure Switch and Signal Apparatus.

No. 237,786. Patented Feb. 15, 1881.

Witnesses
R. H. Whittlesey
C. L. Parker

Inventor Harvey Tilden,
By Attorney George H. Christy (No Model.) 8 Sheets—Sheet 7.

H. TILDEN.
Interlocking Fluid Pressure Switch and Signal
Apparatus.

No. 237,786. Patented Feb. 15, 1881.

Inventor Harry Tilden,
By Attorney George H. Christy

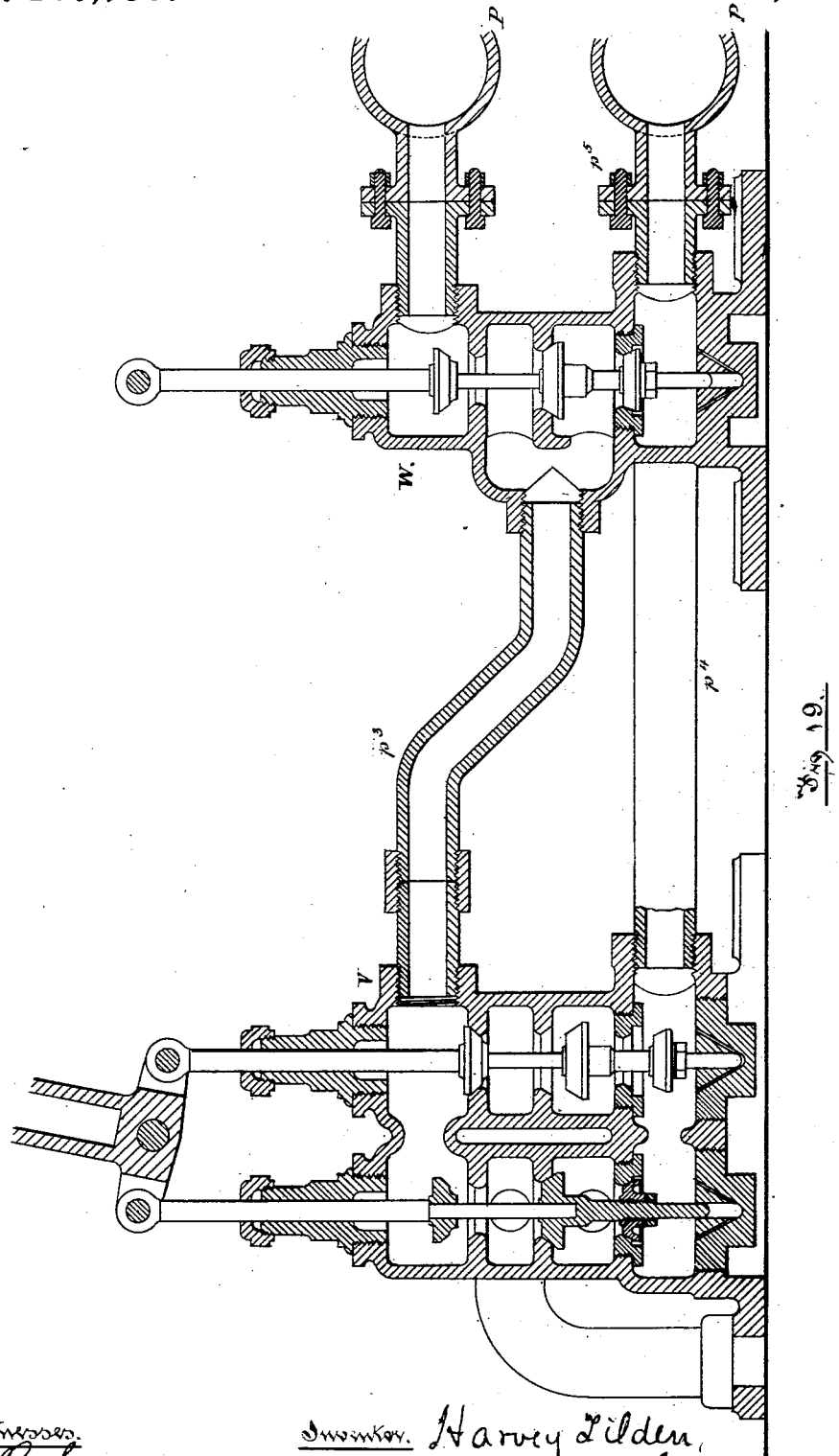

UNITED STATES PATENT OFFICE.

HARVEY TILDEN, OF HARRISBURG, PENNSYLVANIA.

INTERLOCKING FLUID-PRESSURE SWITCH AND SIGNAL APPARATUS.

SPECIFICATION forming part of Letters Patent No. 237,786, dated February 15, 1881.

Application filed September 6, 1880. (No model.)

*To all whom it may concern:*

Be it known that I, HARVEY TILDEN, of Harrisburg, county of Dauphin, State of Pennsylvania, have invented or discovered a new and useful Improvement in Interlocking Fluid-Pressure Switch and Signal Apparatus; and I do hereby declare the following to be a full, clear, concise, and exact description thereof, reference being had to the accompanying drawings, making a part of this specification, in which like letters indicate like parts.

My present invention relates, generally and primarily, to the construction of apparatus for operating the switches and signals of a double-track railway-junction, and forms a part of a system of interlocking switch and signal service wherein the switches and signals are operated by hydraulic power or other fluid-pressure.

In a separate application already filed I have described a system of levers, interlocking devices, fluid-pressure apparatus, and connections, in which, by the proper shifting of the levers, the fluid-pressure is applied and released in the proper manner for giving to signals and switches the desired throw or motion, and at the same time the interlocking devices are so shifted in position that in the varying adjustments or positions of the apparatus the proper switch to be opened or line of connection to be made for the passing of a train cannot be opened or made, nor the safety-signals for such connection be put at "safety," until all other switches which ought to be closed are closed and their appropriate signals set at "danger," and so that after this is all done the opening of the desired switch or connection and the setting of the proper signal or signals at "safety" shall effect the locking of the pre-arranged switches and signals. Apparatus possessing these functions are to be used in connection with the present apparatus; but as such apparatus constitutes no part of the present invention, I will not describe it at length, but merely refer, for purposes of illustration, to Figure 7, Sheet 3, of the accompanying drawings, which shows a frame-work, A, suitable for the purpose, which is to be erected in the cabin.

For the present apparatus four levers are sufficient, one of which is represented at A'. Each lever operates a vertical bar, $A^2$, and at $A^3$ I have shown the interlocking horizontal bars. To these horizontal and vertical bars the interlocking devices may be applied in any of the ways known to the art. Connection is made from each lever, in any suitable way, to a valve-rod, $V^3$, which may operate what I term a "duplex valve" in the valve-case V, and which valve may have the construction described in Patent No. 229,341, granted to Guerber and myself June 29, 1880, Fig. 2, or it may be a single valve, as shown in Fig. 1 of the same patent, the particular valve to be used at any point being hereinafter designated by the terms "duplex" or "single."

The supply and relief or escape pipes are indicated at P P', respectively; but in so far as relates to the present invention other apparatus adapted to the uses named may take the place of that thus referred to. V' represents shut-off valves.

Assuming, now, the presence of apparatus such as that thus designated, and referring to Fig. 8 on Sheet 2, this figure shows a plan or diagram of a double-track junction, wherein $m$ $m$ represent the rails of the right-hand track, (the observer looking toward the right,) and $m'$ $m'$ the switch-rails; and $n$ $n$ represent the rails of the other or left-hand track, and $n'$ $n'$ the switch-rails. The direction for the ordinary running of trains is indicated by arrows.

Figure 6:
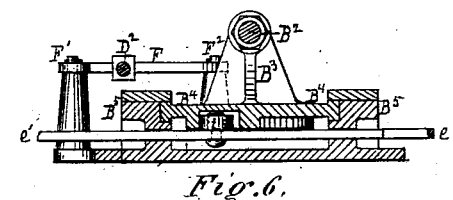
Figure 7:
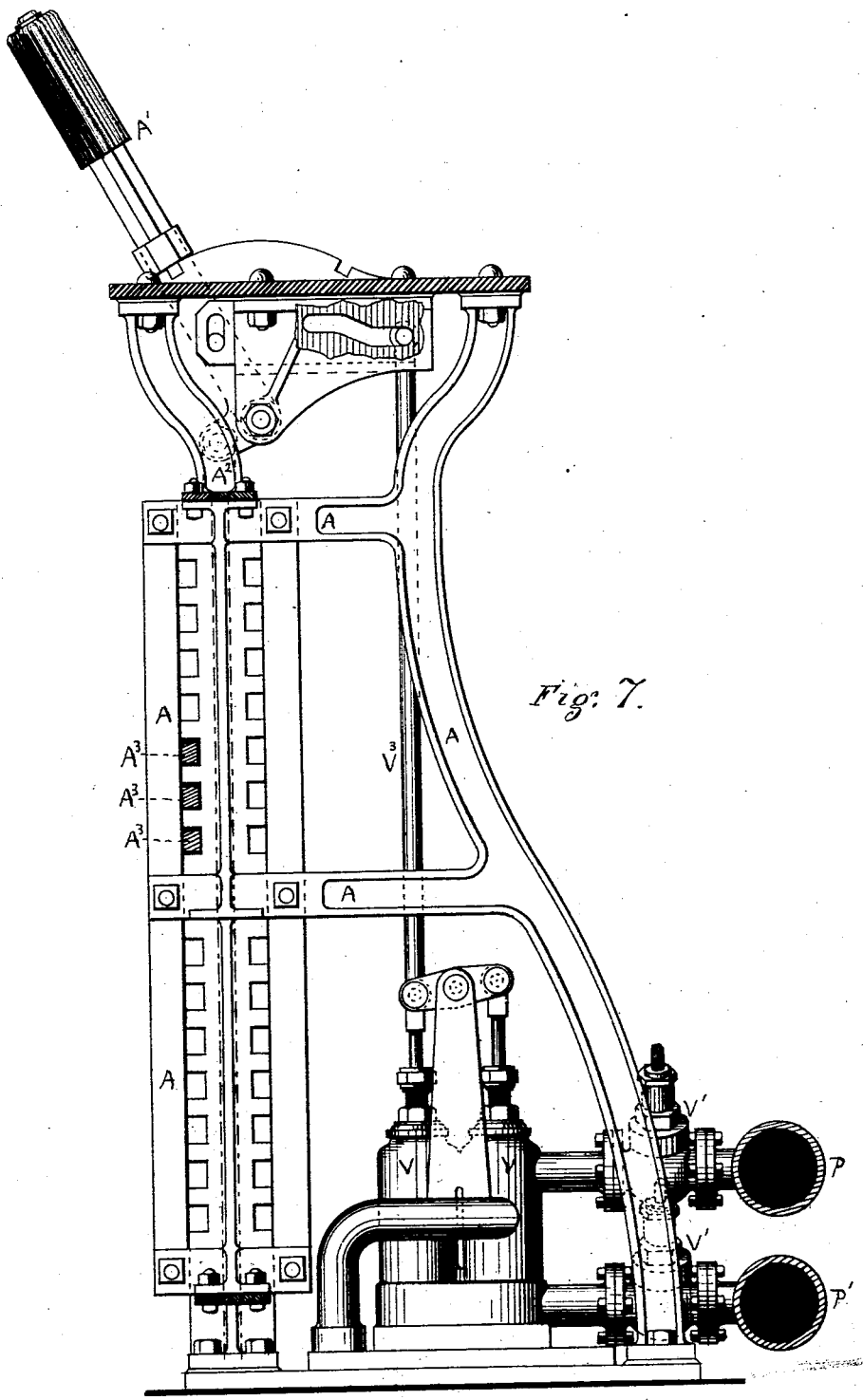

The frame-work for the levers and connection of Fig. 7 may be arranged at A in a cabin, $A^6$. The end levers at $a$ $a'$ are connected each with a single valve, and the intermediate levers, $a^2$ $a^3$, each with a duplex valve. From the opposite ports of the duplex valve at $a^2$ two pipes, $c$ $c'$, extend to and open into a double-acting fluid-pressure cylinder, B, which, with its connections, is shown to an enlarged scale by detached views in Sheet 1, Figs. 3-6, as will presently be described. From the single valve at $a$ pipe $c^2$ leads to a supplemental valve-case, D, at a point intermediate between its ends, and from the opposite ends of this valve-case D pipes $c^3$ $c^4$ lead to the opposite ends of a valve-chamber, G, which is arranged at or in convenient proximity to the home signals $g$ $g'$, and from the middle of this chamber a pipe, $c^5$, leads to the distant signal $h$. At $g$ a branch from the pipe $c^4$ leads to a fluid-pressure cylinder, such as is known in the art for raising and lowering a signal, the raising in this case to a position of "safety," as illustrated at $g^2$, being effected by applying the pressure, and the lowering to the "danger" position, illustrated at $g^3$, being effected, on the release of the pressure, by a counter-weight, spring, or equivalent device, such as will bring the signal to the desired position on the release of the pressure. Like connections are to be made and devices arranged at $g'$ and $h$, the distant signal at "safety" being illustrated at $h'$. The reverse positions of the signals are indicated by dotted lines. Such devices and connections are sufficiently illustrated in Fig. 9 in elevation, where $c^4$ represents one of the pipes, as before; $c^6$, the branch leading to the signal-cylinder $G'$, arranged on a signal-post, $G^2$. The piston-stem $g^4$ will then operate to raise the signal to "safety," when the pressure is applied, and a counter-weight (shown by dark lines on the end of $g$) may bring the signal to "danger," when the pressure is released. The same description will apply to all the other signals.

Figure 5:
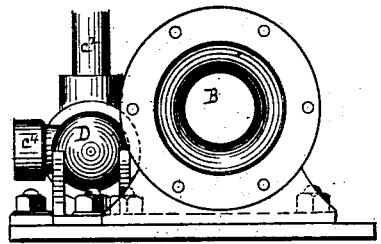
Figure 4:
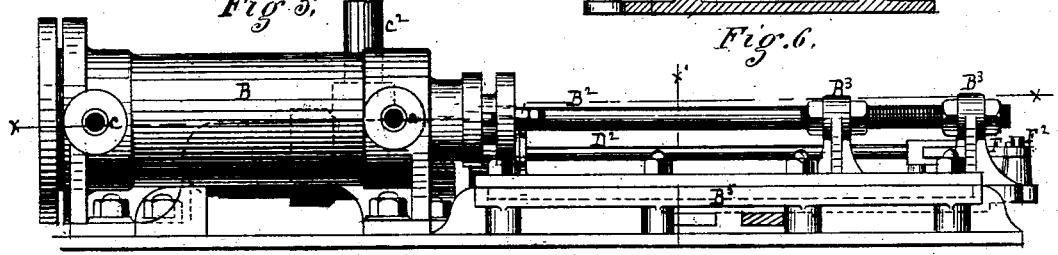
Figure 3:
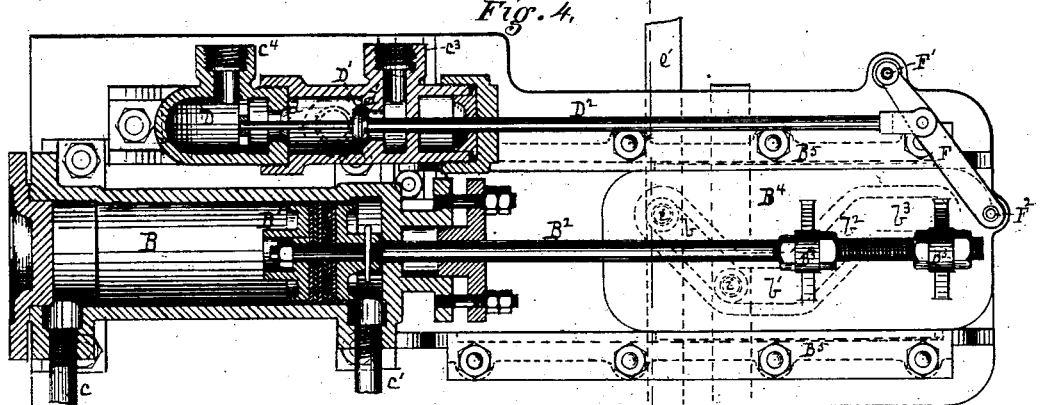

For the detailed construction of the devices lettered B, D, and G reference may be made to Sheet 1, where Fig. 3 is a horizontal sectional view through B and D and their immediate connections in the plane of the line $x\,x$, Fig. 4. Fig. 4 is a side elevation of Fig. 3. Fig. 5 is an end view, and Fig. 6 is a section (looking to the right) in the plane of the line $x'\,x'$, Figs. 3 and 4.

The pipes $c\,c'$ enter the cylinder B on opposite sides of the piston $B'$, so that such piston may be moved in opposite directions by fluid-pressure. To the stem $B^2$ of this piston I secure, by jam-nuts or otherwise, one or more posts, $B^3$, which rise from a sliding plate, $B^4$, which plate, thus having the same motions as the piston $B'$, slides back and forth in suitable ways or guides made in the frame $B^5$. In the under side of the plate $B^4$, I make a groove, the form of which is shown in dotted lines in Fig. 3, where $b$ represents an inclined or diagonal part of the groove. $b'$ connects the forward end of such diagonal part in a line straight or parallel with the piston-stroke, with the adjacent end of a reversely-inclined or diagonal part, $b^2$, from the forward end of which latter a straight part, $b^3$, again extends forward to near the end of the plate. The sides of the frame $B^5$ are boxed or recessed, so as to receive and properly guide in a horizontal plane directly beneath the sliding plate $B^4$ two reciprocating bars, $e\,e'$, which move only in the direction of their length. The bar $e$, (see Fig. 8,) is connected by a bell-crank, $e^2$, with a rod, $e^3$, which in turn is connected with the switch-bar $f$, the latter being the device by which the switch-rails $m'\,m'$ are shifted from one position to the other. The other bar, $e'$, is connected, by bell-crank $e^4$ and rod $e^5$, with one arm of three-armed pivoted lever $s$. One arm, $s'$, of this lever is connected with a safety-bar, $m^2$, having substantially the construction and operation described in United States Patent No. 194,694, August 28, 1877, in such manner as to operate or shift the same, and the third arm is connected by a rod, $s^2$, with a locking-bolt, $s^3$, which bolt is employed to lock the switch or branch rails $m'$ in either position. For this purpose the movable ends of the rails are connected together by a cross-bar, $s^4$, and two holes are made in such bar in such places that the bolt $s^3$ may pass through one or the other of them, as the switch may be set one way or the other, substantially as in United States Patent No. 131,788, October 1, 1872.

Returning to Sheet 1, on the bars $e\,e'$ are wrists $i\,i$, respectively arranged to play in the groove $b\,b^3$ as the plate $B^4$ moves out and back, and by such motion the bars $e\,e'$ receive a reciprocating motion in the direction of their length, with the results presently to be described.

The valve-chamber D contains two valve-seats, $d\,d'$, on which the valve $D'$ is alternately seated. Between the valve-seats is the pipe-connection $c^2$, and outside of them are the pipe-connections $c^3\,c^4$. The valve-stem $D^2$ extends out through the head, and is pivoted to a swinging lever, F, which has a fixed pivotal point, $F'$, to a post on the frame $B^5$, and at its other or free end it is pivoted, as at $F^2$, to a post on the plate $B^4$. The motions which the plate $B^4$ will, through this connection, transmit to the valve $D'$ will presently be explained.

Figure 2:
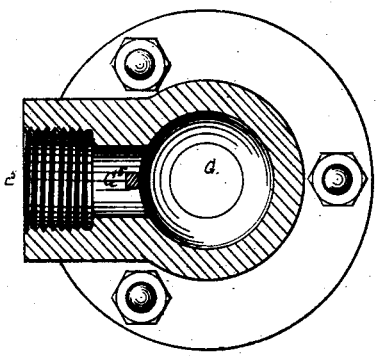

The valve-case arranged at G, Fig. 8, is shown in longitudinal section in Fig. 1 of Sheet 1 and in transverse section in Fig. 2. The pipes $c^3\,c^4$ enter its end ports, $G^3\,G^4$, and the pipe $c^5$ leads from its middle port, $G^5$. Within the case I arrange a valve, $G^6$, of such construction that it may, by fluid-pressure entering the end in or at which it may be seated, be automatically shifted to the opposite seat, and so close or cut off escape or back flow through such port so closed. For this purpose a ball-valve may be employed, as shown in Fig. 1, seating each way, and outside of the port $G^5$, or any other known form of valve, such as $D'$, such as may be caused to close either of two end ports automatically by the action of fluid-pressure entering through the opposite port, an intermediate port being left open in either adjustment of the valve.

With this explanation the operation of the devices shown in Fig. 8 will be readily understood. As shown, the main line of the right-hand track is open for the passage of trains in the direction of the arrow, and the fluid-pressure is operative from a duplex valve at $a^2$, through the pipes $c$, to hold the piston in B over, and thereby keep the switch-rails, switch-lock, and safety-rail in the position shown, and at the same time, by the same adjustment of the duplex valve at $a^2$, the fluid-pressure in the pipe $c'$ is relieved, but in such manner that the pipe shall not be emptied of fluid, and this is also true of all the pipes when the pressure is relieved. By the same pressure operative in cylinder B the valve $D'$, Fig. 3, Sheet 1, is held to its seat $d'$. The single valve at $a$ being properly set, fluid-pressure is then operative through pipe $c^2$, chamber D, and pipe $c^4$ to keep the home signal $g^2$ for main track at "safety," (signal $g^3$ for branch track having been previously lowered to "danger,") and thence the fluid-pressure acts through valve-case G and pipe $c^5$ to hold the distant signal $h'$ at "safety." If, now, the operator at A wishes to reverse the switch $m'$ so as to run a train onto the branch, he first shifts the single valve-lever at $a$ so as to relieve the pressure which is acting to keep the signals $g^2$ $h'$ at "safety." Before he does so, and while the column of water from $a$ to $h$ was at rest, it was simply a motionless hydrostatic column, performing only the function of holding the signals $g^2$ $h'$ at "safety;" but as soon as the back-pressure is relieved at $a$ it then becomes a moving hydraulic column, and each particle of water exercies a force or effect varying with its height and position in the column. Thus, if all the signals be equally counterweighted, they will tend to start down together as soon as the pressure is relieved; but the weight of the column of water which intervenes between $g$ and $h$, acting back and being effective at $g$, will prevent the lessening or reduction of the pressure at $g$ until it has been considerably reduced at $h$, or, in other words, until the signal $h'$ shall have come down to the "danger" position. Thus the distant signal will be first brought to "danger," and then, as the pressure continues to be relieved at $a$, the home signal will next come down to "danger." The switch will then be guarded as against approaching trains, and may be shifted with safety. For this purpose the operator next shifts the duplex valve-lever at $a^2$, which has the effect to relieve the pressure through $c$ and apply it through $c'$. As the piston B', Fig. 3, Sheet 1, begins and continues its back stroke its effects are as follows: First, as the wrist on the bar $e$ traverses the straight part $b'$ of the groove in the plate B$^4$ no effect will be at first produced on bar $e$, but the wrist on the bar $e'$, traversing the inclined part $b$ of the groove, will shift the bar $e'$, and by so doing shift the safety-rail $m^2$ and withdraw the locking-bolt $s^3$, and so unlock the switch; next, the wrist on the bar $e$ will travel down the inclined part $b^2$ of the groove, and in so doing will shift the bar $e$, and with it throw the switch, the other wrist on the bar $e'$ then following the straight part $b'$ of the groove and producing no effect; third, the wrist on the bar $e$ will traverse the straight part $b^3$ of the groove and produce no effect, but the wrist on the bar $e'$ will travel down the incline $b^2$ of the groove and give the bar $e'$ a reverse throw, and through its connections bring the safety-rail $m^2$ back to its former position, and also give to the locking-bolt $s^3$ a forward motion, so as to cause it to enter the other hole in the switch-bar $s^4$ and lock the movable rails, so as to keep thereby a fixed connection from the main to the branch track. Also, while this has been going on the piston D', through the connections already described, has been shifted from $d'$ to seat $d$, whereby the pipes $c^2$ and $c^3$ have been put in communication. The operator then shifts the single valve-lever at $a$ so as to turn on fluid-pressure through the pipe $c^2$. Such pressure, acting through $c^2$, D, and $c^3$, first raises the branch home signal $g^3$ to "safety," and this it does because the resistance at that signal is less than the resistance at the distant signal by the amount of power necessary to put in motion the water-column, which extends from $g'$ to $h$, and thereby convert the latter from a hydraulic to a hydrostatic column. After the signal $g^3$ has been put up to "safety" the water-column beyond is put in motion, and the distant signal $h'$ at $h$ also goes up to "safety." The home main-track signal $g^2$ at $g$ remains at "danger," since fluid-pressure is cut off from the pipe $c^4$ by the position of the valve D' at one end and the automatic valve G at the other end.

To restore the main-track connection it is only necessary to reverse the operation described.

For the other or left-hand track (see Fig. 8) the same home signals are employed—as a main-line home signal, $g$ $g^2$, and a branch-line home signal, $g'$ $g^3$—but two distant signals, one, $h^2$ $h^3$, for the main line, and the other, $h^4$ $h^5$, for the branch. A single valve and valve-lever are arranged at $a'$, and a single pipe, $c^2$, in this case, as before, leads to a like valve-case, D, on the opposite track. Also, a duplex valve and lever are arranged at $a^3$, and like pipes $c$ $c'$, as before, lead to the opposite ends of a like cylinder, B. Also, like pipes $c^3$ $c^4$ lead from the valve-case D to the two sets of signals, the only difference being that as each line requires a distant signal I dispense with the automatic valve G and extend each pipe to its own distant signal; but the operation remains the same in all respects as that already described, except that the grooved plate B$^4$ is omitted, and the switch-bar $f'$ takes it motion directly from the piston-stem of the cylinder B. The distant and home signals are raised and lowered in the same relative order as before by virtue of the action, as described, of the hydrostatic column operating with different degrees of force at different points along the column. In this, which is termed a "trailing switch," the locking-bolt and safety-rail are not usually required; but they may be added if needed, in which case the same appliances should be used as on the right-hand track.

For convenience of illustration, I have added in Sheet 4 detailed drawings of the cylinder B and valve-case D and their immediate connections as used in their modified form on this left-hand track, Fig. 12 being a sectional elevation on the plane of the line $x^2$ $x^2$ of Fig. 14, Fig. 13 being a side elevation of Fig. 14, and Fig. 14 being a horizontal sectional view in the plane of the axes of the cylinder and valve-chamber. These figures are lettered the same as already described with reference to Figs. 3–6 and their operation is the same as set forth with reference to said figures, so far as the devices are alike.

Figure 15:
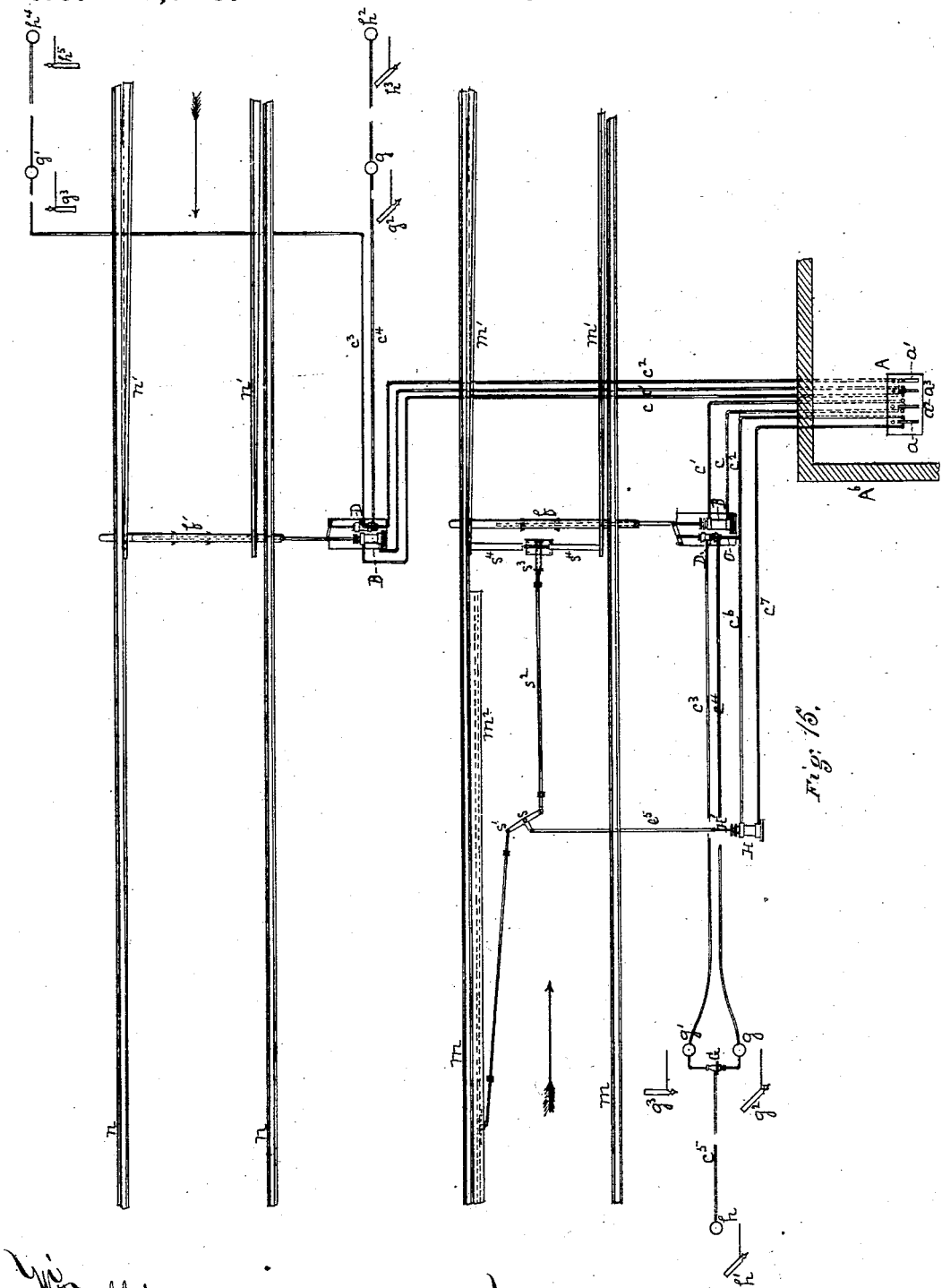
Figure 16:
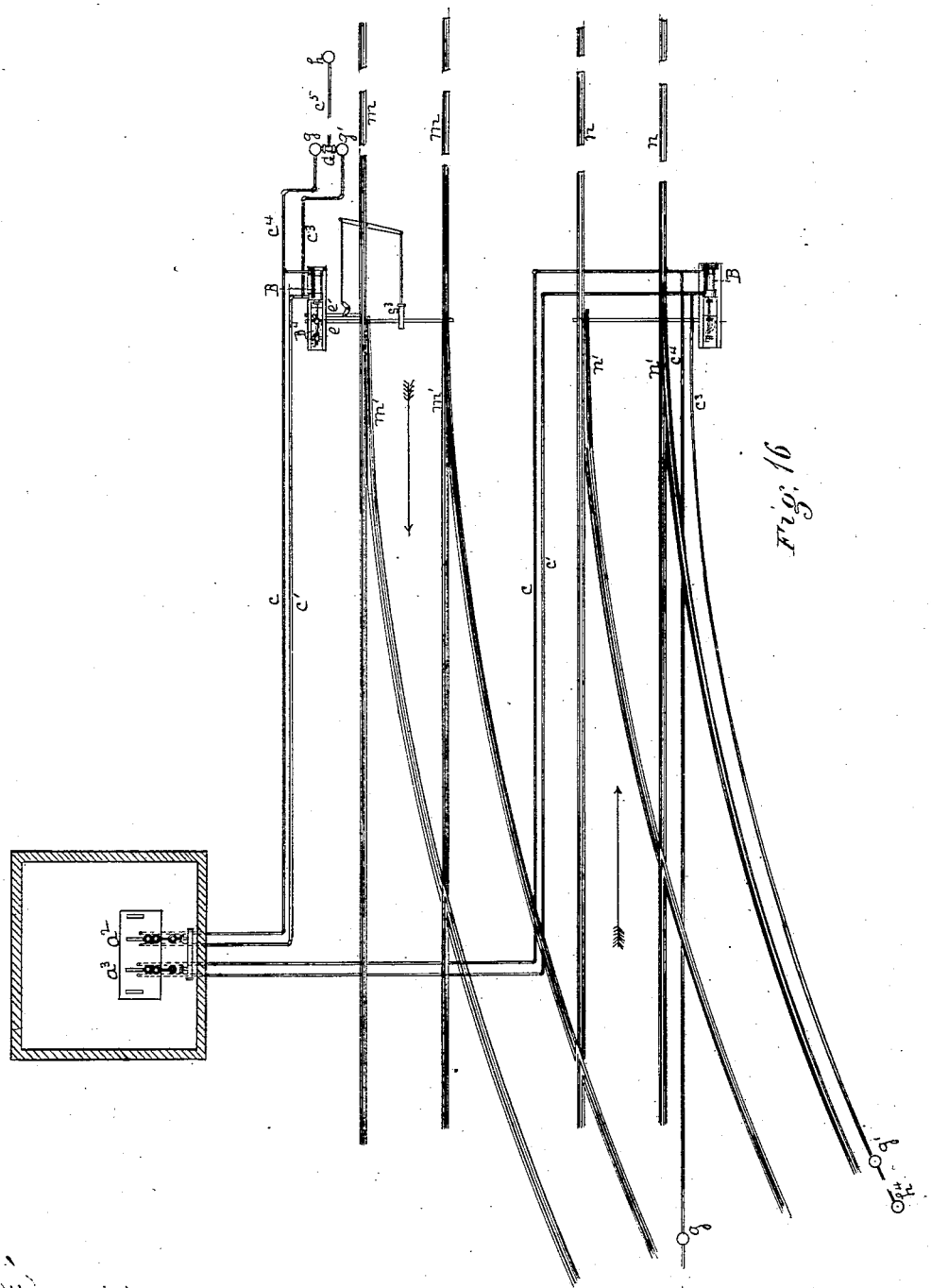

In Fig. 15, Sheet 5, I have shown another diagram of a double-track junction, wherein certain modifications are made, but which further illustrate the same invention. In this figure the same parts have the same letters as in Fig. 8; but the grooved sliding plate $B^4$ of Figs. 3–6, is omitted, as well for the right-hand-track-operating devices as for the left-hand-track devices, so that in the apparatus as organized in Fig. 15 the cylinder B and valve-chamber D and the operative devices connected therewith, as used on both tracks, have the construction illustrated in Figs. 12–14 of Sheet 4; but in this apparatus, instead of a single valve at $a$, as before, I arrange at that point a duplex valve with its appropriate lever. One of its pipes, $c^2$, leads to the valve-case D, as before, by a branch, $o$, but is also extended beyond the branch junction, as at $c^6$, to one end of a cylinder, H, which has the same construction as the cylinder B. The pipe $c^7$ leads from the other supply-port of the duplex valve at $a$ and enters the other end of the cylinder H, and the piston-stem $H'$ of this cylinder is connected directly with the rod $e^5$, which, as before, operates the safety-rail $m^2$ and the locking-bolt $s^3$, and by like connections.

Assuming, now, that the right-hand track of Fig. 15 is open for the passage of trains, as before, a pressure will be on through the pipe $c$, as before, to hold the switch over and through $c^2$ $c^6$ to hold the safety-rail and locking-bolt in place, and also through $c^4$ to hold the main-track home signal at $g$ and the distant signal at $h$ at the "safety" position, pressure in the other pipes being relieved and the branch home signal at $g'$ being at "danger." The operator now, if he wishes to bring the branch line into connection with the main track, first brings all signals to "danger." For this purpose he shifts the lever of the duplex valve at $a$, which relieves the pressure through $c^2$, D, $c^4$, $c^5$, and $c^6$ and turns it on through $c^7$.

By reason of the action of a hydrostatic column, as already explained, the first effect will be produced at the most distant point, which in this case, as before, will be at the distant signal $h$. This signal will then come down to "danger." The next effect will be at the next most distant point, which will be at the main-track home signal $g$, which will also come down to "danger." All signals will now be at "danger," and the switch may be unlocked preparatory to being shifted. Up to this point it will be observed that so much of the hydrostatic column as intervenes between $g$ and the junction-point of $o$ and $c^2$, plus the weight of the counter-weight on the signal $g$, have been operative to keep up the pressure in $c^6$, so that until the signal at $g$ comes down and the part of the water-column thus designated becomes motionless, or becomes merely a hydrostatic column, the piston in the cylinder H has not been relieved of pressure sufficiently to enable it to begin its stroke; but being relieved of such force the pressure in the pipe $c^6$ is next fully relieved, so that the pressure through $c^7$ on the other side of the piston in H will cause such piston to make a forward stroke, and thereby shift the safety-rail $m^2$ and withdraw the locking-bolt $s^3$. Then, by shifting the lever of the next duplex valve at $a^2$ the pressure through $c$ will be relieved, but turned on through $c'$, so as to give the piston $B'$ (see Figs. 12–14) a backward stroke to the position shown in Fig. 14. The movable rails $m'$ $m'$ are thus shifted. Also, the piston-stem $B^2$, acting through the lever F, will at the same time shift the valve $D'$ to the position shown in Fig. 14, and thereby close the port through which communication is made. Now, to relock the switch and restore the proper signals the lever of the duplex valve at $a$ is again shifted so as to turn on water-pressure through $c^2$ and relieve it through $c^7$. As the resistance is greatest at the more distant points of the hydrostatic column, the first effect is produced at the nearest point, which in this case is the cylinder H. The piston in this cylinder thus receives a back throw or motion with the result of shifting the safety-rail $m^2$ back again and giving the locking-bolt $s^3$ a forward thrust into the other hole of the locking-bar $s^4$, and the switch is thereby locked. Fluid-pressure then acts from $c^2$, by the branch $o$, through valve-chamber D and pipe $c^3$, to raise the branch-line signal at $g'$ to "safety," that being the next point of least resistance. The pressure then acting along shifts the automatic valve in G, and, passing along the pipe $c^5$, puts the distant signal at $h$ to "safety." A reversal of the operation described restores the main-track connection and rearranges the signals as before.

The devices for operating the switches and signals of the left-hand track are the same as in Fig. 8, and need not be further described.

In Sheet 6 I have illustrated a double-track junction in which signals and switches are operated by means of only two levers, each operating a duplex valve. From the duplex valve $a^2$ for the right-hand track (looking to the left) two pipes, $c$ $c'$, lead, as before, to the cylinder B; but the valve-case D is dispensed with, and the pipe $c^3$ is connected directly with the pipe $c'$ and the pipe $c^4$ with the pipe $c$, the signals and their connections remaining the same. The shifting-bars $e$ $e'$ are employed as before, as also the grooved sliding plate $B^4$, so that the unlocking, shifting, and relocking of the switch will take place as already described; and I have added this modification of my apparatus chiefly to show how, employing the hydraulic force of two columns of water brought alternately into action by the motions of a single lever, I am enabled to do all the work of, first, lowering all signals to "danger"; second, unlocking the switch; third, shifting the switch; fourth, relocking the switch; and, fifth, restoring the proper and only the proper signals to "safety." Assuming, as before, on the right-hand track, (looking to the left,) that the main line is open, and that fluid-pressure is operative through $c$ to hold the switch over and locked and through $c^4$ to hold at "safety" the main-line home signal at $g$ and the distant signal at $h$, and that pressure in $c'$ and $c^3$ is relieved, so as to bring branch home signal $g'$ to "danger," to open the branch connection the operator shifts his lever at $a^2$, so as to turn on pressure through $c'$ and relieve it through $c$. In consequence of the hydraulic action referred to, the first effect on the column relieved is at the most distant point and on the column to which pressure is applied at the nearest point; and it should be noted here, both as regards this form or modification of the apparatus and as regards the others already described, that the resistances due to the devices to be moved at all points on the same column are to be the same, or so nearly the same that the presence of the intermediate parts of the water-column will render it necessary to use more force to move the more distant devices. Thus, in this case, if it requires one hundred pounds of force to move the piston in the cylinder B, with its connections, the friction and resistance due to the weight and counter-weight of the nearest signal should be about one hundred pounds, or so near it that the force necessary to put in motion the column of water intermediate between B and such nearest signal, added to such friction and resistance, will exceed one hundred pounds; and the same rule applies as between two signals on the same water-column. Bearing this in mind, it will be readily understood that the results of the shifting of the lever last referred to will be in order as follows: First, the distant signal at $h$ will come down to "danger;" second, the main-line home signal at $g$ will come down to "danger." Then the fluid back of the piston in B will be fully relieved, and the fluid-pressure already present in $c'$, and acting on the front side of the piston, will begin to move the piston. The action of the groove in the plate $B^4$ on the wrists of the bars $e\ e'$, as already described with reference to Fig. 3, will then, third, cause the withdrawal of the locking-bolt $s^3$; fourth, shift the switch, and, fifth, relock the switch-bar by a forward stroke of the locking-bolt. The fluid-pressure has then performed its full function at that point. The hydrostatic column from B to $g'$ is next put in motion as a result of a continuation and practically of an increase in the operative pressure, so as to give an operative hydraulic column from $a^2$ to $g'$, the latter being the next point of resistance. The sixth result follows— namely, putting the branch-line home signal at $g'$ to "safety." The seventh result next follows, which is shifting the automatic valve in G to its seat on the port of the pipe $c^4$, as already described. The water-column leading to the distant signal at $h$ is then put in motion, and gives the final result—namely, raising it to the position of "safety." A like duplex valve is arranged at $a^3$, by which to operate by like connections the switches and signals of the other or left-hand track.

Figure 17:
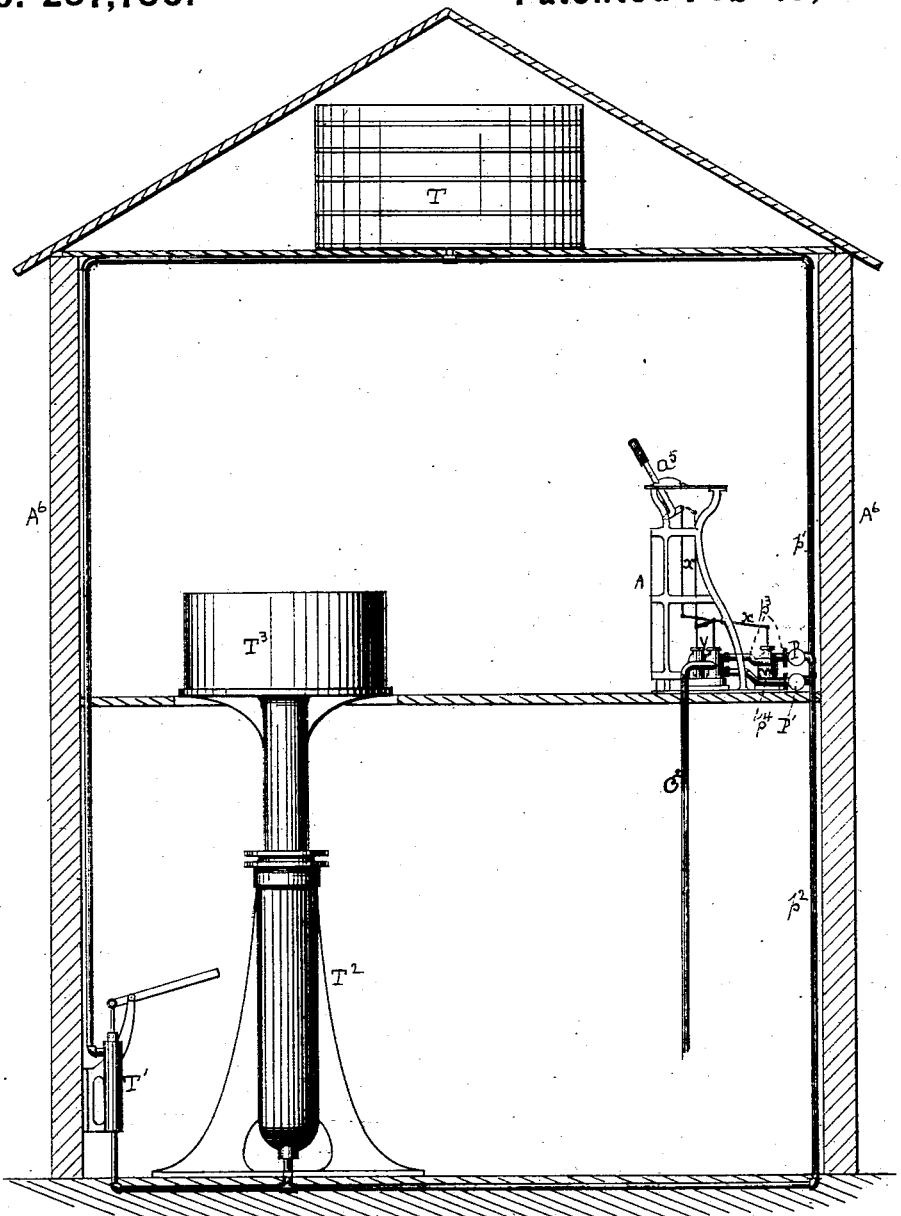
Figure 18:
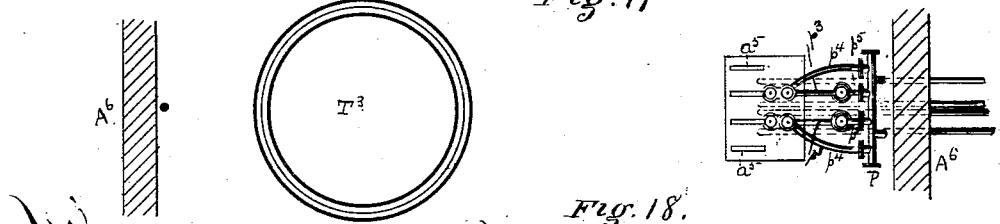

That the manner in which the water-pressure acts under the conditions already named may be better understood, I have shown in Sheet 7, Figs. 17 and 18, one suitable arrangement of accumulator, pump, supply and waste tank, &c. $A^6$ represents the cabin, and A the frame, of the interlocking-lever apparatus. The waste-pipe P', by a pipe, $p'$, leads to a waste-tank, T, which is elevated high enough to prevent the operating-pipes described from being emptied in any part when effective pressure is released. By any suitable pump, T', water is pumped from this tank into the accumulator $T^2$, which is so weighted, as at $T^3$, as to give the desired water-pressure through the pipes when the pressure is turned on. From the accumulator water-pressure passes, by pipe $p^2$, to the supply-pipe P, already described.

In connection with the apparatus last described, Sheets 1 to 6, I have shown an additional arrangement of valves for bringing all signals to "danger," which is sometimes desirable when the tracks are to be repaired, and particularly so at crossings. To this end I add an additional lever, $a^5$, for each duplex lever or each set of signal and switch connections; and, by suitable connections, thence, as at $x\ x$, Fig. 17, I provide for operating a single valve, $w$, which I arrange on the line of pipe-connection $p^3$ from the supply P to the duplex valve V, and the waste-port of said single valve has a connection with the waste-pipe P'; but that this feature of my invention may be more readily understood, I have illustrated it by a sectional view of the double and single valves referred to in Fig. 19. The duplex valve V has also its independent waste-connection $p^4$ with the pipe P'. Now, when the single valve $w$ is opened or raised water-pressure will pass freely through $p^3$ to the proper duplex valve, and the operation will be as already described. but if I wish to bring all the signals which, by the action of the duplex valves, are set at "safety" to the "danger" position, so that all signals shall be at "danger," I reverse the single valves, which cuts off the water-supply through $p^3$ to the duplex valves and opens waste through $p^5$ to P'. In such case, as the ports through which fluid-pressure is transmitted to the signals to hold them at "safety" are, through the duplex valves, in communication with $p^3$, such fluid-pressure will escape through $p^3$, $w$, and $p^5$ to the waste and such signals will come down to "danger;" but no fluid-pressure being turned on through other pipes to change danger-signals to "safety," signals previously at "danger" will remain so and all lines will be blocked; and such single valves for bringing all signals to "danger" may be added to any of the forms of arrangements of apparatus hereinbefore described, or to other like apparatus.

In Figs. 10 and 11 I have shown one modified form of automatic valve, already referred to, as a suitable substitute for the valve G.

I claim herein as my invention—

1. In combination with an inelastic fluid-column receiving and discharging pressure at one end, two or more signals operated therefrom in orderly succession at different points in the length of the column, substantially as set forth.

2. In combination with an inelastic fluid-column receiving and discharging pressure at one end, one or more switch-operating cylinders and pistons and one or more signals operated therefrom in orderly succession at different points in the length of the column, substantially as set forth.

3. In a switch-actuating mechanism, a slotted plate, $B^4$, moved in opposite directions by fluid-pressure, in combination, by wrists playing in the slots, with bars $e\ e'$ and switch locking and shifting mechanism, whereby at each stroke of the plate the switch will be unlocked, shifted, and relocked, substantially as set forth.

4. A valve-case, D, having two end valve-seats, an interposed valve, one central and two end ports, in combination, by stem $D^2$ and lever F, with piston and stem of the cylinder B, substantially as described, whereby the same piston-motion which shifts the switch shall automatically change the direction of the fluid-pressure to one or the other of two signals or sets of signals.

5. In combination with two lines of fluid-pressure pipes with a signal on each, uniting in a single line and a signal on it, a valve at the junction of such lines seating in its case in opposite directions, and shifted automatically to either seat by the fluid-pressure which operates the signals, substantially as set forth.

6. In combination with a valve of a signal apparatus, through which to apply pressure to raise signals on one line and relieve it to lower signals on another, a valve, $w$, arranged on the line of fluid-pressure supply, and having a connection with the waste, substantially as set forth, whereby the previously-raised signals may be lowered without raising those previously lowered, substantially as set forth.

7. In combination with locking-bolt $s^3$ and safety-bar $m^2$, a double-acting fluid-pressure cylinder, H, for operating such bolt, substantially as set forth with reference to Fig. 15.

8. The fluid-pressure cylinder H and pipes $c^6$ $c^7$, in combination, by branch $o$, with valve D, and by lever F with cylinder B, substantially as set forth.

In testimony whereof I have hereunto set my hand.

HARVEY TILDEN.

Witnesses:
  S. HARVEY THOMPSON,
  GEORGE H. CHRISTY.